(12) United States Patent
Hamad et al.

(10) Patent No.: US 9,624,330 B2
(45) Date of Patent: Apr. 18, 2017

(54) NCC AS A FUNCTIONAL SCAFFOLD FOR AMINE-CURED EPOXY NANOCOMPOSITE MATERIALS OF TUNABLE PROPERTIES

(71) Applicant: Celluforce Inc., Montreal (CA)

(72) Inventors: Wadood Yasser Hamad, Vancouver (CA); Shunxing Su, Richmond (CA)

(73) Assignee: CELLUFORCE INC., Montreal (CA)

( * ) Notice: Subject to any disclaimer, the term of this patent is extended or adjusted under 35 U.S.C. 154(b) by 44 days.

(21) Appl. No.: 14/442,033

(22) PCT Filed: Nov. 12, 2013

(86) PCT No.: PCT/CA2013/050858
§ 371 (c)(1),
(2) Date: May 11, 2015

(87) PCT Pub. No.: WO2014/071527
PCT Pub. Date: May 15, 2014

(65) Prior Publication Data
US 2015/0322191 A1      Nov. 12, 2015

Related U.S. Application Data

(60) Provisional application No. 61/725,201, filed on Nov. 12, 2012.

(51) Int. Cl.
| C08B 15/06 | (2006.01) |
| C08L 63/00 | (2006.01) |
| C08L 63/02 | (2006.01) |
| C08L 63/04 | (2006.01) |
| C08F 251/02 | (2006.01) |
| C08G 59/50 | (2006.01) |
| C08L 51/02 | (2006.01) |

(52) U.S. Cl.
CPC ............ *C08F 251/02* (2013.01); *C08B 15/06* (2013.01); *C08G 59/50* (2013.01); *C08G 59/504* (2013.01); *C08L 51/02* (2013.01); *C08L 63/00* (2013.01); *C08L 2312/00* (2013.01)

(58) Field of Classification Search
None
See application file for complete search history.

(56) References Cited

U.S. PATENT DOCUMENTS

| 2011/0182990 A1* | 7/2011 | Su | A61L 15/225 424/484 |
| 2013/0011385 A1* | 1/2013 | Li | C08F 2/00 424/130.1 |
| 2014/0350188 A1* | 11/2014 | Hamad | C08F 251/02 525/190 |

FOREIGN PATENT DOCUMENTS

| CA | 2786738 A1 | 7/2011 |
| CA | 2788855 A1 | 8/2011 |

OTHER PUBLICATIONS

Araki, Jun et al., Sieric Stabilization of a Cellulose Microcrystal Suspension by Poly(ethylene glycol) Grafting, 2001, pp. 21-27, vol. 17, American Chemical Society.
Habibi, Youssef et al., Highly Filled Bionanocomposites from Functionalized Polysaccharide Nanocrystals, 2008, pp. 1974-1980, vol. 9, American Chemcial Society.
Hamad, Wadood et al., Structure-Process-Yield Interrelation in Nanocrystalline Cellulose Extraction, 2010, pp. 392-402, vol. 88, The Canada Journal of Chemical Engineering.
Katz, D et al., Rubber Elasticity in a Highly Crosslinked Epoxy System, 1963, pp. 417-421, vol. 4, Polymer.
Liu, Song et al., Durable and Regenerable Biocidal Polymers: Acyclic N-Halamine Cotton Cellulose, 2006, pp. 6477-6482, vol. 45, No. 19, American Chemical Society.
Ljungberg, N. et al., New Nanocomposite Materials Reinforced with Cellulose Whiskers in Atactic Polypropylene: Effect of Surface and Dispersion Characteristics, 2005, pp. 2732-2739, vol. 6, American Chemcial Society.
Lu, Jue et al., Surface Modification of Microfibrillated Cellulose for Epoxy Composite Applications, 2008, pp. 1285-1296, vol. 49, No. 5, Elsevier Ltd.
Zoppe, J. et al., ATRP Modification of Cellulose Fibers and Nanocrystals, 2008, pp. 1, (Abstract), ACS Natl. Meet.
Zoppe, Justin O. et al., Poly(N-isopropylacrylamide) Brushes Grafted from Cellulose Nanocrystals via Surface-Initiated Single-Electron Transfer Living Radical Polymerization, 2010, pp. 2683-2691, vol. 11, No. 10, American Chemical Society.
Yi, Jie. et al., "Temperature-induced chiral nematic phase changes of suspensions of poly (N,N-dimethylaminothyl methacrylate)-grafted cellulose nanocrystals", Cellulose, Aug. 15, 2009, pp. 989-997, vol. 16, No. 6, Springer Science+Business Media B.V.
European Patent Office, Extended European Search Report, Jul. 22, 2016, Munich, Germany, 3 pages.

* cited by examiner

*Primary Examiner* — Robert Sellers
(74) *Attorney, Agent, or Firm* — Taft Stettinius & Hollister LLP (57) ABSTRACT

The disclosure relates to a novel process for functionalizing NCC, a method for producing amine-cured epoxy-based nanocomposites through the use of said functionalized NCC, and nanocomposites thereof. The process for functionalizating NCC comprises providing a mixture of NCC and one or more monomers. The mixture is suitable for free radical polymerization and the monomer is cross-linkable with epoxy and is aqueous soluble. The polymerization takes place in the presence of a free radical initiator and oxygen is purged from the mixture and the initiator solution. The epoxy-based nanocomposite is produced by mixing the funtionalized NCC with an amine-curable epoxy resin and a hardener, in a solvent, and allowing the mixture to cure.

17 Claims, 10 Drawing Sheets

NCC AS A FUNCTIONAL SCAFFOLD FOR AMINE-CURED EPOXY NANOCOMPOSITE MATERIALS OF TUNABLE PROPERTIES

The present application is a U.S. National Phase of International PCT Application No. PCT/CA2013/050858, filed on Nov. 12, 2013, which claims priority to U.S. Provisional Patent Application No. 61/725,201, filed on Nov. 12, 2012, the contents of each application hereby incorporated by reference in its entirety.

FIELD OF THE DISCLOSURE

The disclosure relates to a novel process for functionalizing NCC, a method for producing amine-cured epoxy-based nanocomposites through the use of said functionalized NCC, and nanocomposites thereof.

BACKGROUND OF THE DISCLOSURE

Nanocrystalline cellulose (NCC), or cellulose nanocrystals (CNC), are extracted as a colloidal suspension by (typically sulfuric) acid hydrolysis of lignocellulosic materials, such as bacteria, cotton, or wood pulp. NCC is comprised of cellulose, a linear polymer of $\beta(1\rightarrow4)$ linked D-glucose units, whose chains are arranged to form crystalline and amorphous domains. Colloidal suspensions of cellulose crystallites form a chiral nematic structure upon reaching a critical concentration. Hydrogen bonding between the cellulose chains can stabilize the local structure in NCC, and plays a key role in the formation of crystalline domains. The iridescence of NCC self-assemblies is typically characterized by the finger-print patterns, where the patch work of bright and dark regions is typical of spherulitic behavior of fibrillar crystals in which the molecules are packed with their axes perpendicular to the fibrillar axis. NCC is also characterized by high crystallinity (between 85 and 97%, typically greater than 90%) approaching the theoretical limit of the cellulose chains (Hamad and Hu, Can. J. Chem Engrg., 2010, 88: 392-402).

Owing to its unique strength and self-assembly properties, NCC can act as high-performance reinforcement in polymer systems. The major obstacles to NCC application in composite manufacture are: (1) aggregation of NCC particles, (2) poor dispersion of the hydrophilic NCC particles in mostly hydrophobic polymer matrices, and (3) poor interfacial adhesion between NCC and polymer. Different approaches have been followed to increase NCC's dispersion and interaction with polymer matrices. Use of surfactants is a simple enough method, but a large amount of surfactant is normally required which would negatively impact the strength of the resulting composite. Surface modification, on the other hand, generally involves reaction with the hydroxyl groups on the NCC surface. Silanes have, for example, been employed to graft hydrophobic groups onto the NCC surface. Moreover, polymers with hydroxyl reactive groups have been used as well, such as polyethylene glycol (PEG) (see Araki, J. et al. Langmuir, 2001, 17 (1), 21-27, Polycaprolactone (PCL) (see Habibi, Y. et al. Biomacromolecules, 2008, 9 (7), 1974-1980) and poly(propylene) (PP) (see Ljungberg, N. et al. Biomacromolecules 2005, 6 (5), 2732-2739). Such modifications can make NCC more hydrophobic and give NCC reasonable stability in organic solvents. However, these reactions (i) generally involve several, intricate steps, (ii) are therefore costly, and (iii) have limited scalability.

The International Standards Organisation (ISO) has stipulated that the use of the term cellulose nanocrystals (CNC), should replace nanocrystalline cellulose (NCC), however the two are used herein interchangeably.

SUMMARY OF THE DISCLOSURE

In one aspect, there is provided a process for functionalizing NCC comprising:
(i) providing a mixture of NCC and one or more monomers, wherein said mixture is suitable for free radical polymerization and said monomer is cross-linkable with epoxy and is aqueous soluble;
(ii) providing a free radical initiator or a solution thereof;
(iii) purging oxygen from the mixture of (i) and the solution of (ii);
(iv) mixing (i) and (ii) after step (iii) to allow polymerization; and
(v) isolating said functionalized NCC.

In one aspect, there is provided a functionalized NCC prepared in accordance with the process as defined herein.

In one aspect, there is provided a functionalized NCC, wherein said functionalized NCC is comprising a plurality of polymer chains cross-linkable with an epoxy resin, said polymer chains being covalently bonded to hydroxyl groups of cellulose subunits of said NCC.

In one aspect, there is provided a hardener, said hardener comprising the functionalized NCC as described herein in admixture with an amine-based hardener.

In a further aspect, there is provided a nanocomposite comprising one or more amine-cured epoxy resin and a functionalized NCC.

In a further aspect, there is provided a process for preparing an epoxy-based nanocomposite comprising:
i) mixing a functionalized NCC, an amine-curable epoxy resin and a hardener in a suitable solvent; and
ii) allowing the mixture obtained from i) to cure to obtain said nanocomposite.

In one aspect, there is provided a method for improving at least one property of an amine-cured epoxy comprising adding a functionalized NCC to said epoxy.

DETAILED DESCRIPTION OF THE EMBODIMENTS

Epoxy resins are known for their high strength and stiffness. This invention deals with developing amine-cured epoxy nanocomposite systems that have improved properties through the use of nanocrystalline cellulose (NCC) as both cross-linker and reinforcement domain. An aspect of the present disclosure is the functionalization reaction of nanocrystalline cellulose (NCC).

The inventors have observed that functionalization of NCC as described herein creates new opportunities for improving the cross-linking density within epoxy, thereby contributing to improving mechanical properties. It is believed that NCC acts as a functionalised scaffold that produces novel highly flexible (or tough) epoxy. This is a unique property that epoxy does not have.

The functionalization reaction described herein can be an aqueous free radical surface grafting polymerization and a large variety of free radical initiators and monomers can be used. Functionalized NCC can be used to reinforce a variety of amine-cured epoxy resins.

The monomers used for functionalizing NCC are selected to be cross-linkable with epoxy and soluble in water. Acrylamide, specifically Dimethylamino propyl methacrylamide (DPMA), is used in the examples below. However, the choice of monomers is not limited to the aforementioned. Other possible monomers that can be used in the NCC functionalization reaction are: N-(Isobutoxymethyl)acrylamide, Methacrylamide, N-(3-Methoxypropyl)acrylamide, N-Isopropylmethacrylamide, N-Isopropylacrylamide, N-(Hydroxymethyl)acrylamide, N-Hydroxyethyl acrylamide, N,N-Dimethylacrylamide, 3-Acryloylamino-1-propanol, N-Acryloylamido-ethoxyethanol, (3-Acrylamidopropyl)trimethylammonium chloride, 2-Acrylamidoglycolic acid. The overriding factor is that the corresponding polymer of the chosen monomer should also be compatible with the epoxy-hardener system, so that functionalized NCC can be well dispersed in the resin matrix.

Free radical polymerization requires a suitable initiator. Non-limiting examples of generally suitable initiators include: persulfates, peroxides, transition metal ions, or other common free radical initiators. Co-catalysts can also be used in some cases to act as reducing agents in the reaction. Suitable co-catalysts can be either inorganic, such as copper (II) chloride and manganese (II) chloride, or organic, such as ammonium oxalate and ammonium tartrate dibasic.

Functionalization of NCC is necessary for the crosslinking and dispersion in epoxy resin matrices. NCC-based nanomaterials can be synthesized by in situ surface graft co-polymerization of NCC in an aqueous medium using a suitable monomer. The process begins by providing a water suspension of NCC and monomer in the desired ratios, and then diluting with deionized water (DI) to achieve the required concentration. The mass ratio of NCC to that of the monomer can be adjusted, ranging from about 1:10 to about 10:1. Examples include from about 1:5 to about 5:1 or about 1:3 to about 3:1 or for example about 1:2. In the final reaction solution, the concentration of NCC is controlled to be from about 0.5% to about 5%. The pH of the reaction can be from 10 to 14. The reaction is initiated using a suitable free radical initiator, optionally in the presence of a suitable co-catalyst. The required amount of initiator is dissolved in DI water. Both initiator and NCC solutions are then purged (e.g. with an inert gas such as nitrogen) for a suitable duration. The polymerization starts by adding the initiator solution into the NCC solution, where the initiator is added in two steps. The reaction is allowed to proceed for 1 to 24 hours at a suitably controlled temperature, from about 21° C. to 90° C. After completion of the reaction, the product is isolated and can be further purified by centrifugation with a 50/50 acetone/water mixture. The resulting functionalized NCC, i.e., poly(DPMA)-NCC in this case, is hydrophobic and typically dispersible in polar solvents—for instance, methanol and dimethyl sulfoxide (DMSO).

In one embodiment, there is provided a functionalized NCC, wherein said functionalized NCC is comprising a plurality of acrylamide polymer chains cross-linkable with an epoxy resin, said polymer chains being covalently bonded to hydroxyl groups of cellulose subunits of said NCC. The amount of polymer chains grafted on NCC, such as acrylamide polymers, can be characterized as a grafting yield.

As used herein, the grafting yield for the functionalized NCC can be defined as ratio of grafted polymer to total added monomer. One possible means for assessing the ratio is by gravimetric measurements.

In further embodiments, the grafting ratio of the functionalized NCC is from 1-20%, ideally around 15-20%.

A further characterizing feature of the functionalized NCC, is observed by reviewing the IR spectrum. For example, the C—N and CNH vibrations of an acrylamide (e.g. poly(DPMA)) at about 1500 $cm^{-1}$ of the IR spectrum shows the successful grafting onto the NCC surface.

A variety of epoxy resin products, including commercially available resins, can be used in this invention. For example, liquid resins based on the diglycidyl ether of bisphenol A (also termed DGEBA or BADGE type resins) can be useful. Other types of epoxy resins include bisphenol F type epoxy, epoxy phenol novolac, and epoxy cresol novolac. Some commercial examples include, but are not limited to, Araldite MY 720 (Huntsman), Araldite MY 510 (Huntsman), Tactix 742 (Huntsman), and Tactix 556 (Huntsman).

In certain embodiments, the epoxy portion can remain fixed, and variations in processing and performance of the resin are obtained by making changes to the hardener. The amine hardener used herein is not particularly limited. Examples of suitable hardeners can be: Aliphatic amines (diethylenetriamine, DETA), cycloaliphatic amines (isophorone diamine, IPD; or diamineocyclohexane, DACH), aromatic amines (4,4'-diaminodiphenyl methane, DDM or MDA; 4,4'-diaminophenyl sulfone, DDS; m-phenylenediamine, MPDA), as well as catalysts, including tertiary amines, BF3-monoethylamine, or imidazoles. Criteria for choosing the amine hardener (or mixture thereof) include cost of the hardener, processing requirements and performance requirements of the resulting mixture. As a general rule, use of a 1:1 stoichiometric ratio of the hardener amine hydrogen to epoxide groups will be acceptable. Other stoichiometric ratios are possible so as to attain specific formulations for optimal processing and product performance. The choice is influenced by (i) the required softening point or glass transition temperature of the resin, which is in turn affected by the choice of hardner, curing cycle and resin type, (ii) resistance to oxidative degradation, and (iii) resistance to thermally-induced chain scission.

Amine hardeners that may be used in accordance with this disclosure include polyetheramines (PEAs) exhibiting steric hindrance near the amine (e.g. with JEFFAMINE® D-230 amine). Cycloaliphatic amines, ethyleneamines (e.g. DETA, TETA, and TEPA) and unhindered polyetheramines may be used. Amine hardeners may be combined to modify the viscosity and reactivity of the hardener. Additionally, some amines such as imidazole and its derivatives can be used as catalytic or co-curing agents, as are some guanidine derivatives such as "dicy" (dicyandiamide orcyanoguanidine).

In one embodiment, the functionalised NCC described herein can be provided alone for use as an additive to be mixed with the epoxy components (e.g. to be added at the time of mixing of the components) Alternatively, the functionalised NCC described herein can be mixed (blended) with the hardener (which is a necessary ingredient for ultimately making amine cured epoxy) to produce a new class of hardeners that can produce toughened and stronger epoxy.

In one embodiment, there is therefore provided a hardener for use in amine-cured epoxy resins, said hardener comprising the functionalized NCC as described herein in admixture with an amine-based hardener.

The amount of functionalized NCC, such as poly(DPMA)-NCC, used in the epoxy resin, is not particularly limited, however for most applications a substantially small amount is required. For example, the amount of NCC material in the composite can be up to about 15% w/w; or up to about 10% w/w; or up to about 5% w/w; or from about 0.5% to about 15% w/w; or from about 1% to about 5% w/w; or alternatively about 4% w/w. The amount of NCC, or functionalized NCC, is predicated by the level of desired improvement in performance (e.g., 20% versus 100% increase in toughness), whereby NCC functions as a reinforcement network or scaffold, as well as enhances the cross-linking density within the epoxy resin.

As discussed above, there is provided a method for improving at least one property of an amine-cured epoxy comprising adding a functionalized NCC to said epoxy.

Without being bound to theory, it is believed that the functionalized NCC described herein provides surprisingly advantageous properties because of its ability to act as cross-linker and reinforcement agent. In principle, it is therefore possible to tailor the performance requirement of the epoxy resin. Without limitations, the properties improved by the functionalized NCC can be mechanical properties such as one or more of tensile strength response, stiffness, toughness, dynamic storage modulus, and dynamic loss modulus.

The following examples are provided to further illustrate details for the preparation and use of the functionalized NCC as well as nanocomposites containing same. They are not intended to be limitations on the scope of the instant disclosure in any way, and they should not be so construed. Those skilled in the art will readily understand that known variations of the conditions and processes of the following preparative procedures can be used to prepare these functionalized NCC and nanocomposites.

Unless otherwise specified, the chemicals, used as received, are purchased from Sigma-Aldrich except NCC, which is prepared in-house by sulfuric acid hydrolysis of kraft bleached softwood pulp.

Example 1

Preparation 1: Surface Graft Polymerization of NCC with N-[3-(Dimethylamino)propyl]methacrylamide (DPMA)

The reaction began by mixing an aqueous suspension of NCC at the required concentration with DPMA. The mass ratio of NCC to that of the monomer was 1:2 and NCC concentration was 3% w/w in this particular example. The pH of the reaction solution was pH 11.5.

Figure 1:
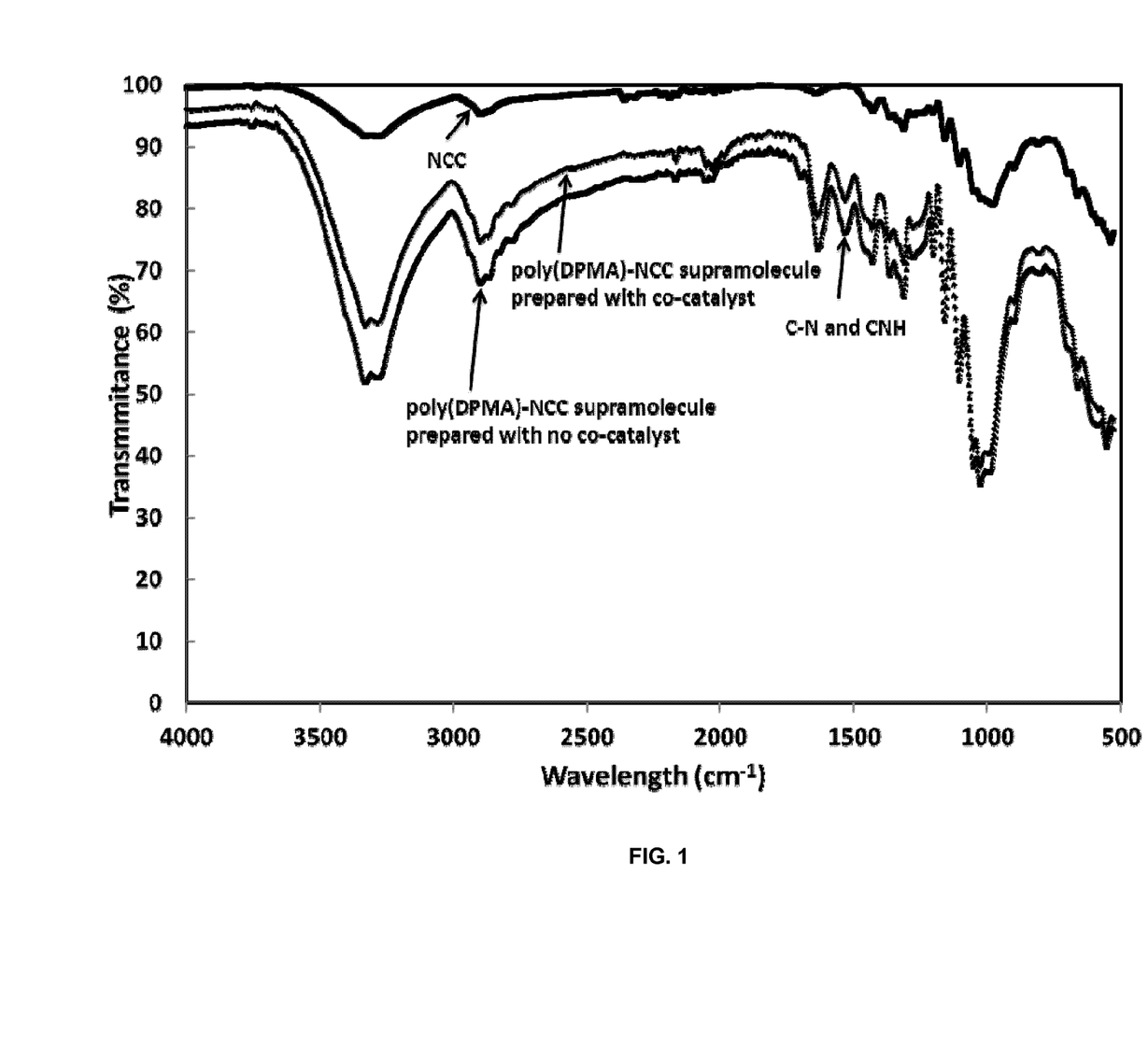
FIG. 1 is FT-IR spectrum of poly(DPMA)-NCC prepared with and without a co-catalyst.
Figure 2:
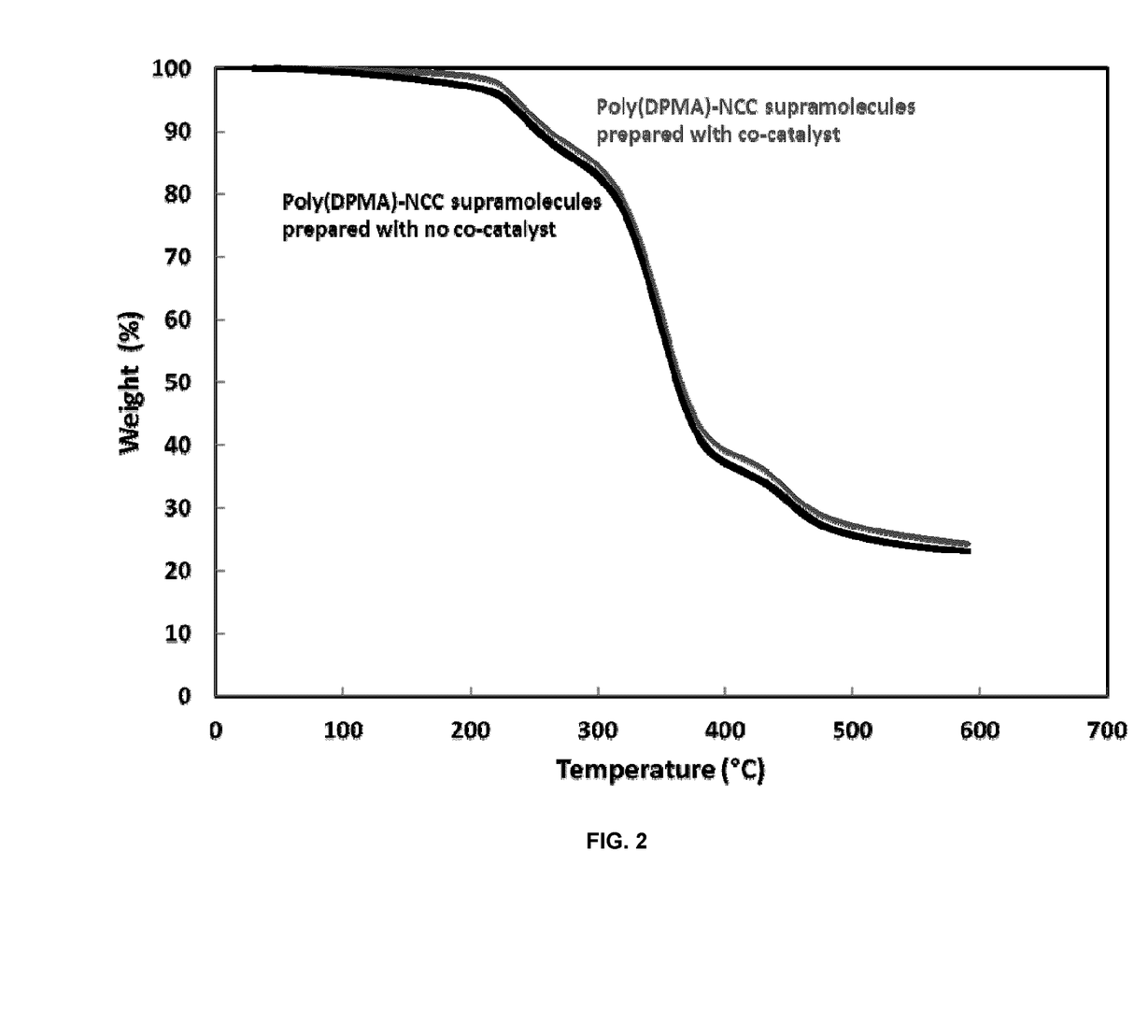
FIG. 2 is Thermogravimetric (TGA) response of poly(DPMA)-NCC prepared with and without co-catalyst.
Figure 3:
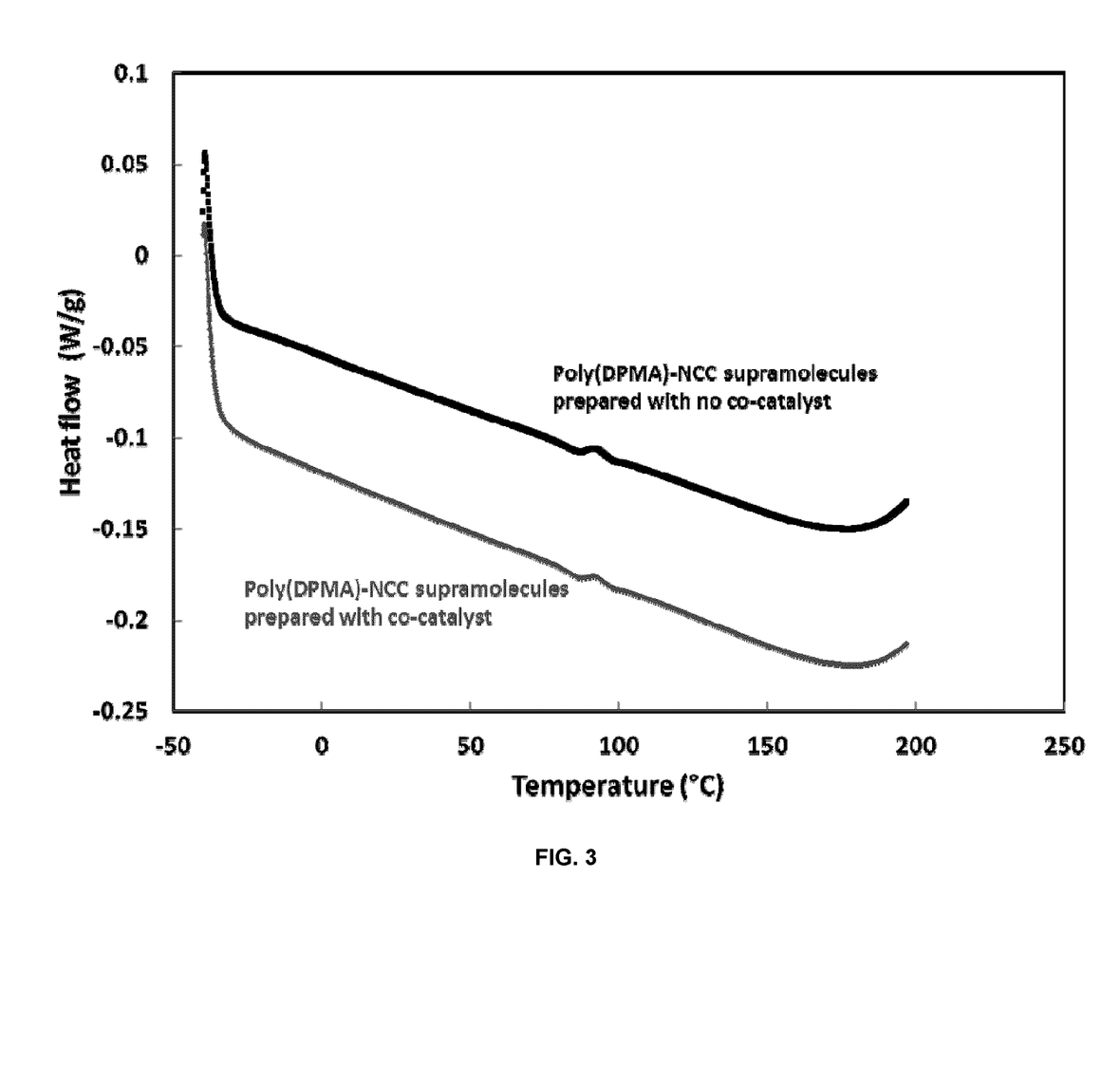
FIG. 3 is Differential scanning calorimetric (DSC) response of poly(DPMA)-NCC prepared with and without co-catalyst.

The reaction was initiated using ammonium persulfate (APS) and the molar ratio of APS:DPMA is 1.2:100. The initiator was dissolved in DI water. Both APS and NCC solutions were then purged with nitrogen for 30 mins. The polymerization starts by adding the APS solution into the NCC solution. The reaction was then allowed to proceed for 18 hours at 60° C. After completion of the reaction, the solid material was centrifuged by adding acetone to obtain a 50/50 w/w acetone/water mixture. Centrifugation was carried out at 4,000 rpm for 30 min, and was repeated twice. The product was centrifuged once more with pure acetone to complete the purification protocol. FIG. 1 clearly shows the peak at about 1500 $cm^{-1}$ representing C—N and CNH vibrations, which are indicative of successful poly(DPMA) grafting onto the NCC surface. FIGS. 2 and 3 illustrate the thermal stability of the functionalized NCC, poly(DPMA)-NCC. These figures show that probable degradation of the material initially starts above 170° C., followed by a second stage above 300° C.

The grafting yield for the functionalized NCC in this preparation, defined as ratio of grafted polymer to total added monomer, was 15.3±2.6%. The particle size, determined by Zetasizer measurements, of the resulting poly(DPMA)-NCC supramolecular material was 212±1.2 nm.

Example 2

Preparation 2: Surface Graft Polymerization of NCC with N-[3-(Dimethylamino)Propyl]Methacrylamide Using Co-Catalyst The reaction began by mixing an aqueous suspension of NCC at the required concentration with DPMA. The mass ratio of NCC to that of the monomer was 1:2 and NCC concentration was 3% w/w in this particular example. The pH of the reaction solution was pH 11.5.

The reaction was initiated using ammonium persulfate (APS) and the molar ratio of APS:DPMA is 1.2:100. The initiator was dissolved in DI water. Both APS and NCC solutions were then purged with nitrogen for 30 min. A co-catalyst, ammonium oxalate, at the ratio of 1:1 to APS, was first dissolved in DI water and quickly added into the reaction right before adding APS. The polymerization started by adding the APS solution into the NCC solution, and the reaction was allowed to proceed for 18 hours at 40° C. After completion of the reaction, the solid material was centrifuged by adding acetone to obtain a 50/50 w/w acetone/water mixture. Centrifugation was carried out at 4,000 rpm for 30 min, and repeated twice. The product was centrifuged once more with pure acetone to complete the purification protocol. FIG. 1 clearly shows the peak at about 1500 cm$^{-1}$ representing C—N and CNH vibrations, which are indicative of successful poly(DPMA) grafting onto the NCC surface. FIGS. 2 and 3 illustrate the thermal stability of the functionalized NCC, poly(DPMA)-NCC. These figures show that probable degradation of the material initially starts above 170° C., followed by a second stage above 300° C.

The grafting yield for the functionalized NCC in this preparation, defined as ratio of grafted polymer to total added monomer, was 15.4±1.7%. The particle size, determined by Zetasizer measurements, of the resulting poly (DPMA)-NCC supramolecular material was 252±5.8 nm.

Thermogravimetric measurements as a function of temperature for Preparation 1 and 2 are practically identical (FIG. 2), as are the differential scanning calorimetric responses (FIG. 3). This illustrates that the thermal stability of poly(DPMA)-NCC supramolecular materials prepared with or without using a catalyst is practically identical, and their potential processability will be similar.

Example 3

Preparation and Properties of Amine-Cured NCC-Epoxy Nanocomposite Systems

To prove the functionality of NCC poly(PDMA)-NCC supramolecular materials, amine-cured epoxy nanocomposite systems were prepared using NCC and poly(DPMA)-NCC. To further confirm the wide applicability of this novel approach, two epoxy systems were examined: A high-purity bisphenol A diglycidylether epoxy resin, and a semi-solid reaction product of epichlorohydrin and phenol-formaldehyde epoxy resin. Of the former type, we used one commercial epoxy resin, D.E.R. 332 (Dow Chemicals), and of the latter type, D.E.N. 438, an epoxy novolac resin (Dow Chemicals). In both cases, the hardener used was JEFFAMINE D-230 polyetheramine (Huntsman), which is a difunctional primary amine with an average molecular weight of about 230.

To prepare epoxy film samples, epoxy, hardener and NCC were mixed together in a suitable solvent, for instance, dimethylformamide (DMF). The resin and curing agent are reacted at approximately stoichiometric quantities determined from specific information provided by relevant chemical supplier. In this case, to calculate the stoichiometric ratio, the amine H equivalent weight is first determined from the following equation:

Amine H eq. wt.=(MW of amine)/(no. of active hydrogen)

where, MW is the molecular weight. The stoichiometric ratio is then determined from the equation:

phr of amine=(Amine H eq wt)(100)/(epoxide equivalent wt of resin)

where, phr is parts by weight per 100 parts resin. In this case it is 5.27 parts per hundred parts filled formulation. After stirring for 30 min, the mixture was sonicated for 10 min and poured into TEFLON dishes. DMF was evaporated at 60° C. for 24 hours, and the temperature increased to 80° C. under vacuum for 3 hours. The samples were further cured at 120° C. for another 12 hours.

Figure 4:
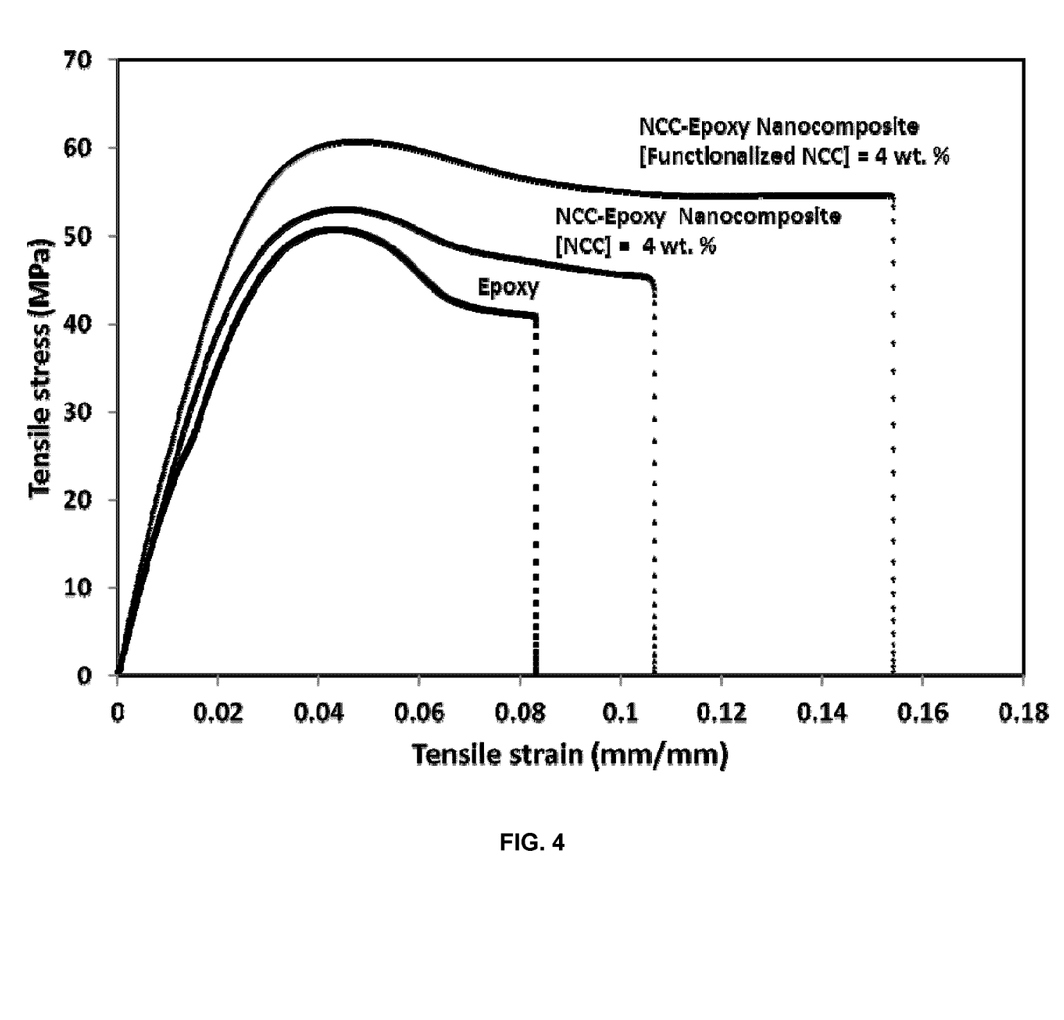
FIG. 4 is tensile response of amine-cured epoxy (bisphenol A diglycidylether) vis-à-vis samples reinforced with NCC or poly(DPMA) functionalized NCC.
Figure 5:
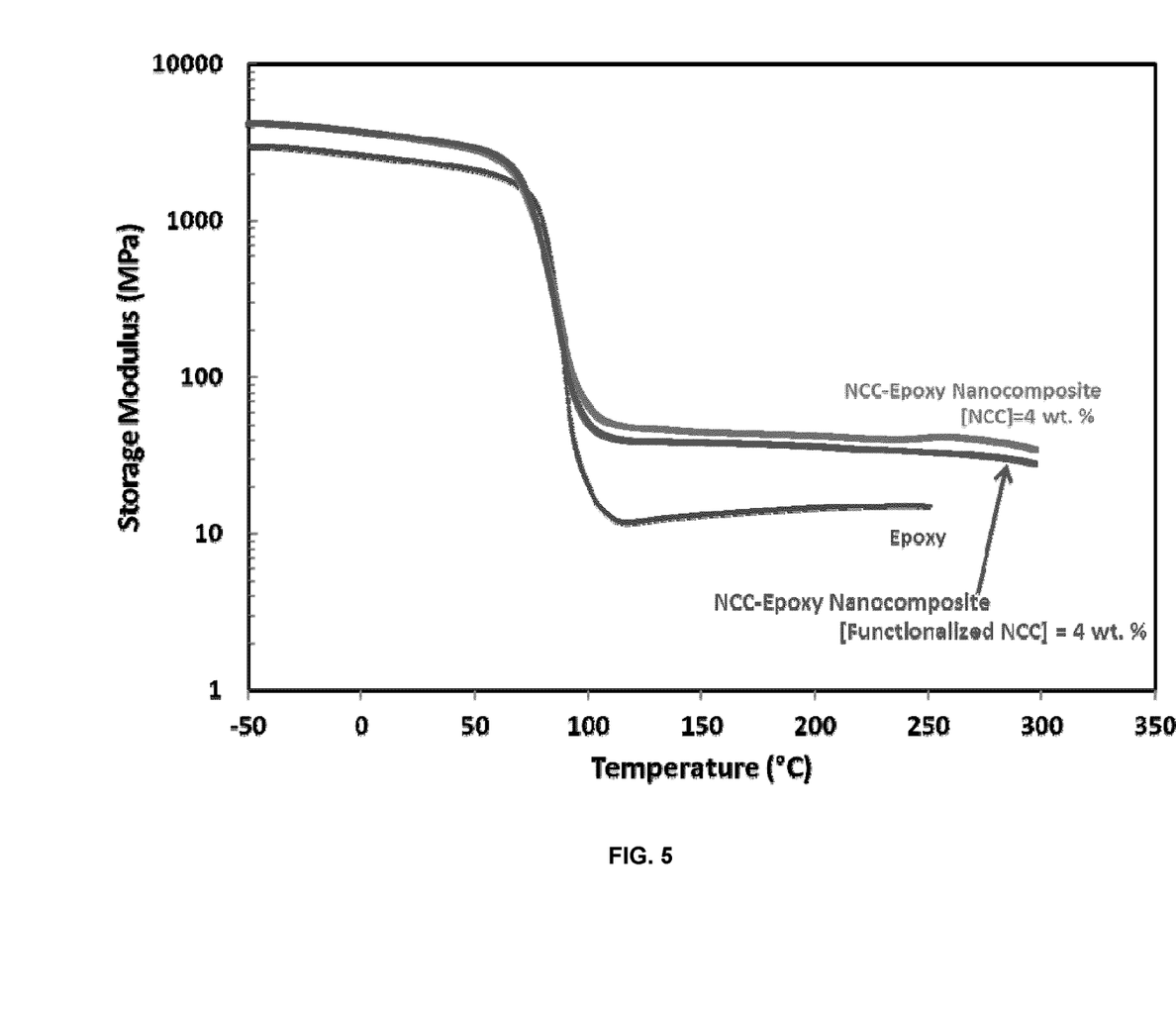
FIG. 5 is dynamic storage modulus as a function of temperature response of amine-cured epoxy (bisphenol A diglycidylether) vis-à-vis samples reinforced with NCC or poly(DPMA) functionalized NCC.
Figure 6:
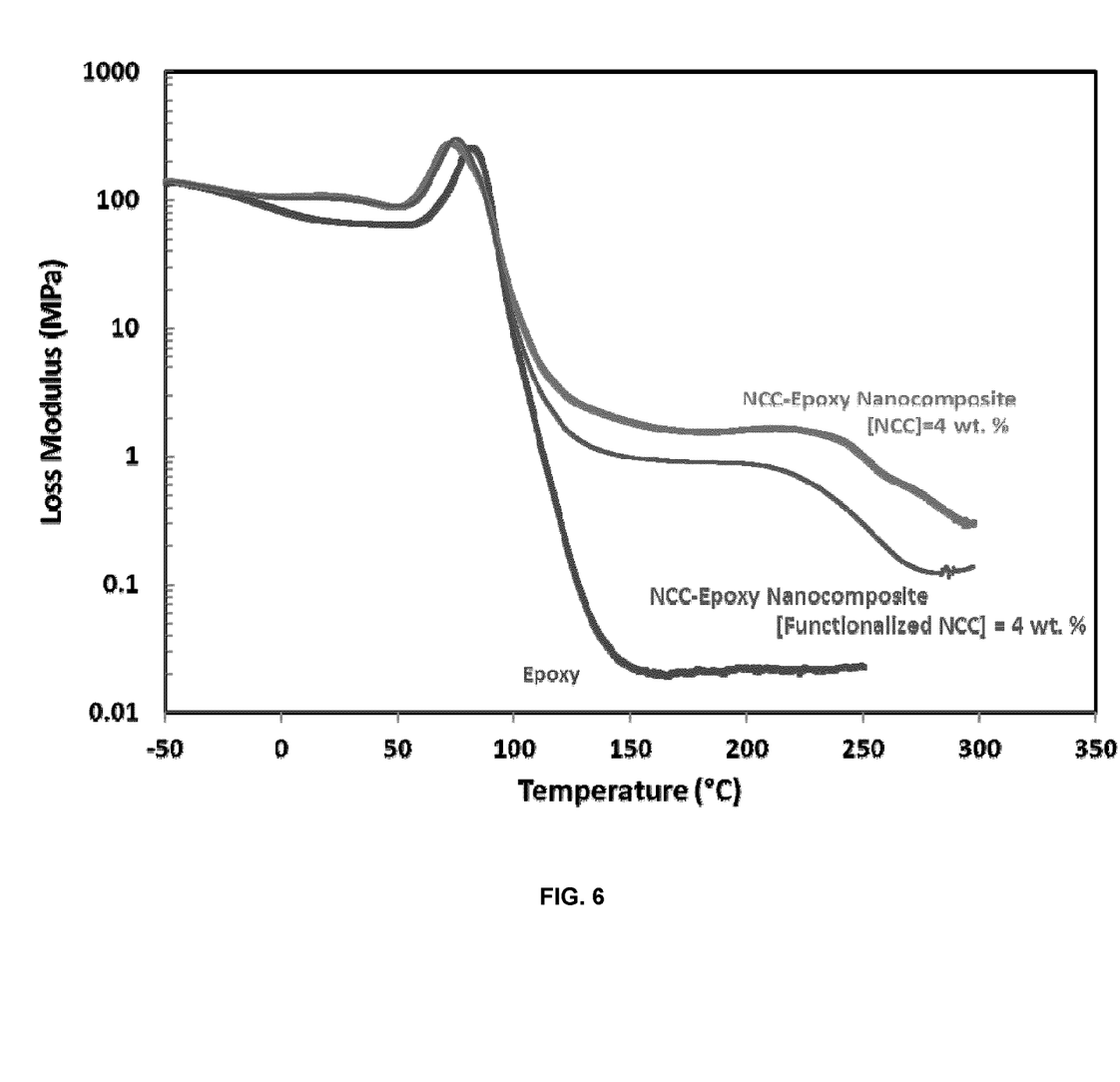
FIG. 6 is dynamic loss modulus as a function of temperature response of amine-cured epoxy (bisphenol A diglycidylether) vis-à-vis samples reinforced with NCC or poly(DPMA) functionalized NCC.

For tensile property measurements, the cured films were cut into 5 mm-width strips and conditioned at 23° C. and 50% R.H. for 48 hours. The tensile measurements were performed at a gauge length of 5 mm and grip separation rate of 5 mm/min using an Instron tensile testing equipment. It is evident from Table 1 (using D.E.R. 332 epoxy system) that NCC and functionalized NCC significantly improve the mechanical properties of the resulting nanocomposite materials. Incorporation of 4 wt. % NCC improves the ultimate tensile stress, Young's modulus, and strain at break by 7%, 18% and 15%, respectively. This indicates that NCC acts both as reinforcement and cross-linking agent with the epoxy resin. That is to say, the cross-linking density of the resulting NCC-epoxy nanocomposite system was significantly enhanced by using NCC. Functionalization of NCC through the grafting of poly(DPMA) onto NCC to produce poly(DPMA)-NCC supramolecular materials further enhanced the cross-linking density. Examining Table 1 and Table 2 (using D.E.N. 438 epoxy resin) reveals that all mechanical properties, ultimate tensile stress, Young's modulus and strain at break were appreciably enhanced relative to the property of the starting epoxy system (FIG. 4). FIG. 5 and FIG. 6 further confirm these trends for the dynamic mechanical properties of NCC-epoxy nanocomposites, where storage and loss moduli are increased by, at least, one-order of magnitude relative to epoxy.

The cross-link densities for our NCC-epoxy nanocomposite materials were calculated (Table 3) from the plateau region above $T_g$ (150° C. in our case) using the following equation derived from the theory of rubber elasticity:

$$M_c = \frac{\alpha \rho RT}{E'}$$

where, $M_c$ is the number-average molecular weight of the network segments between cross-link points; R is the gas constant; T is degrees in K; α is a front factor with a value of ~1.88 for aliphatic amine-cured epoxies; ρ is the sample density, and E' is the storage modulus at T (Katz, D.; Tobolsky, A. V., Polymer 1963, 4, 417).

Figure 7:
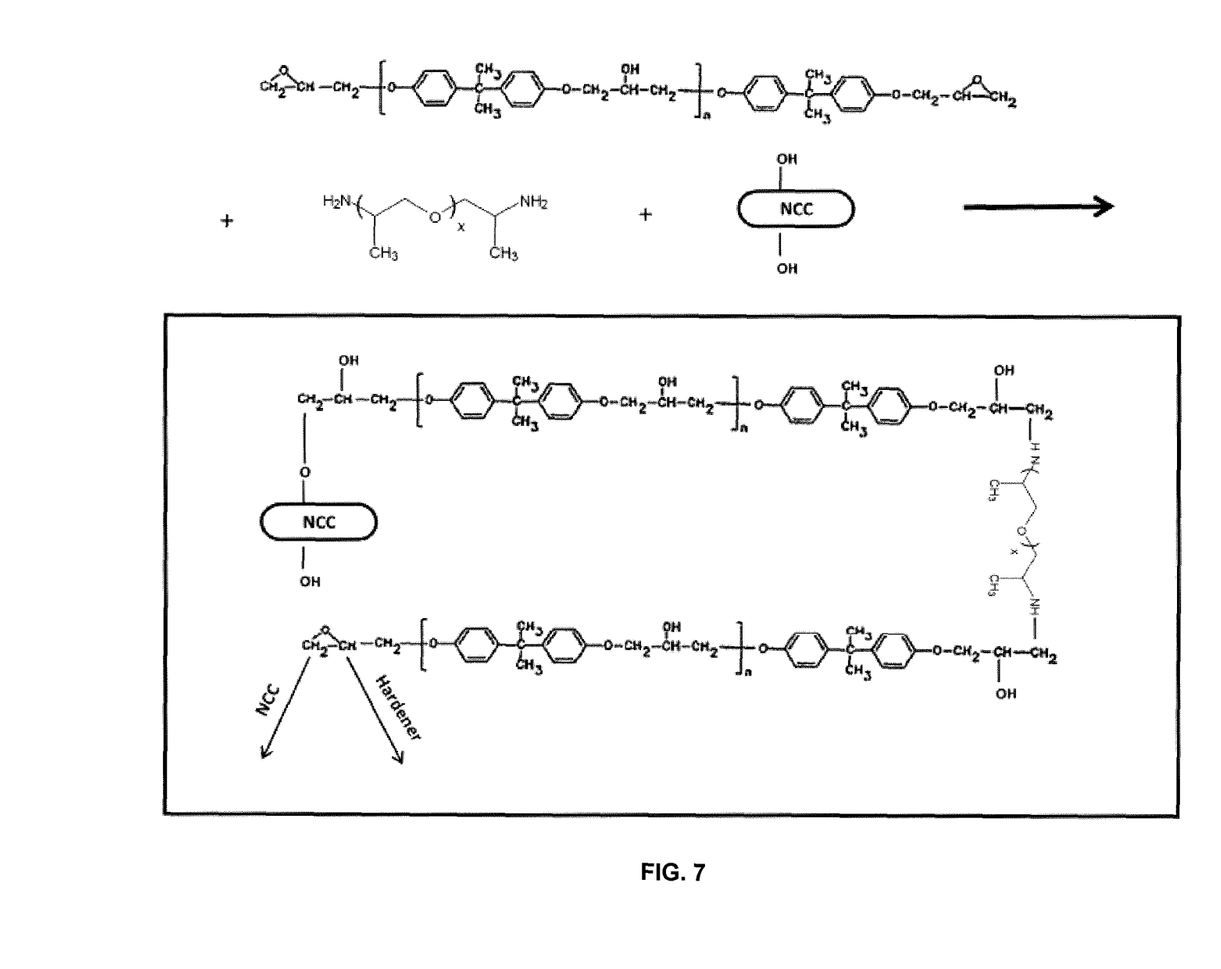
FIG. 7 is schematic representation of the cross-linking mechanism using NCC in amine-cured NCC-epoxy nanocomposite materials.
Figure 8:
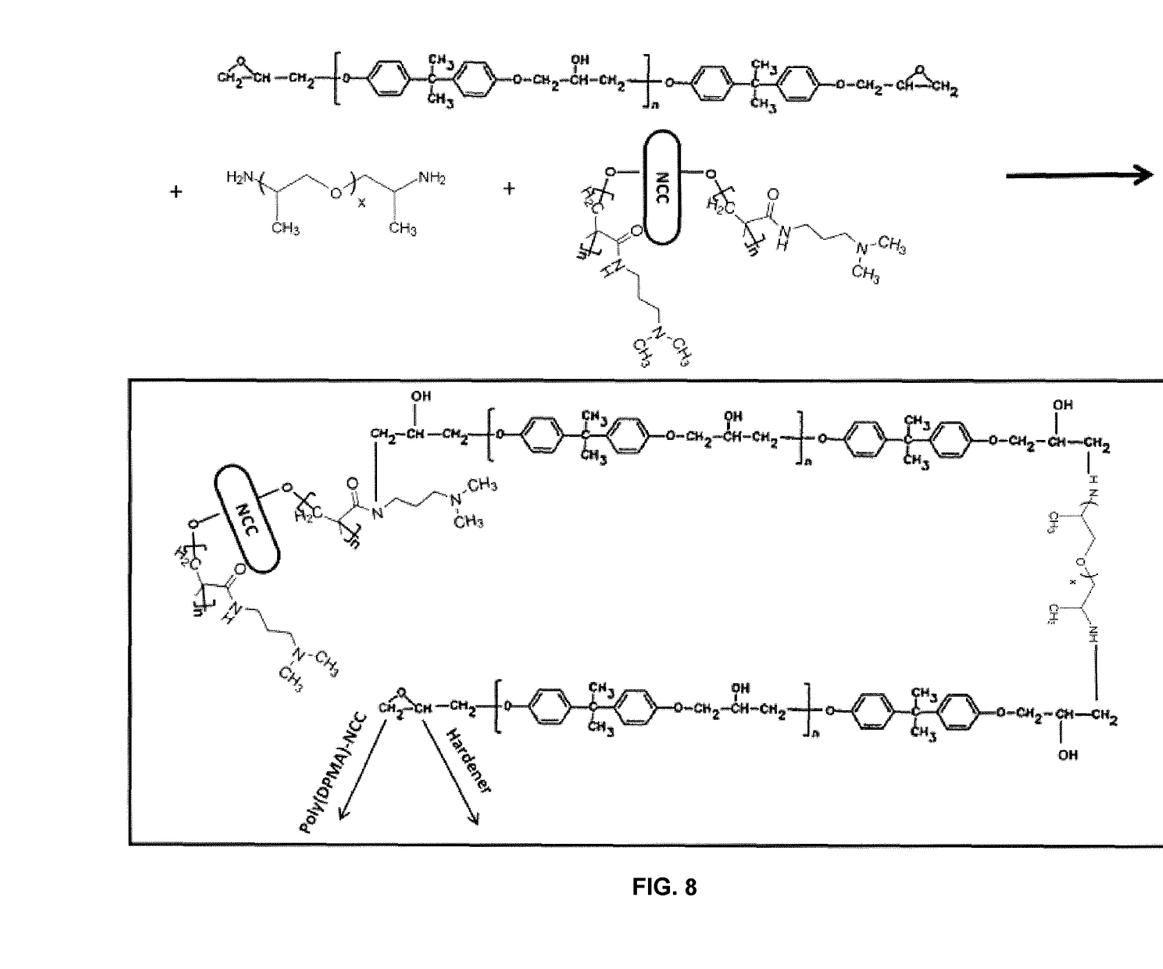
FIG. 8 is schematic representation of the cross-linking mechanism using functionalized NCC in amine-cured NCC-epoxy nanocomposite materials)

The measured densities of the samples described in Table 3 are practically identical, and it is therefore conclusive that the improvement in dynamic and static mechanical properties of the NCC-epoxy nanocomposite materials is due to both reinforcement and cross-linking of NCC or functionalized NCC. It is further evident that functionalized NCC, i.e., poly(DPMA)-NCC supramolecules, renders the epoxy network significantly more flexible. FIG. 7 and FIG. 8 present a schematic of the cross-linking scenario in the presence of NCC (FIG. 7) or functionalized NCC (FIG. 8), which essentially holds true for any type of amine-cured epoxy system.

Figure 9:
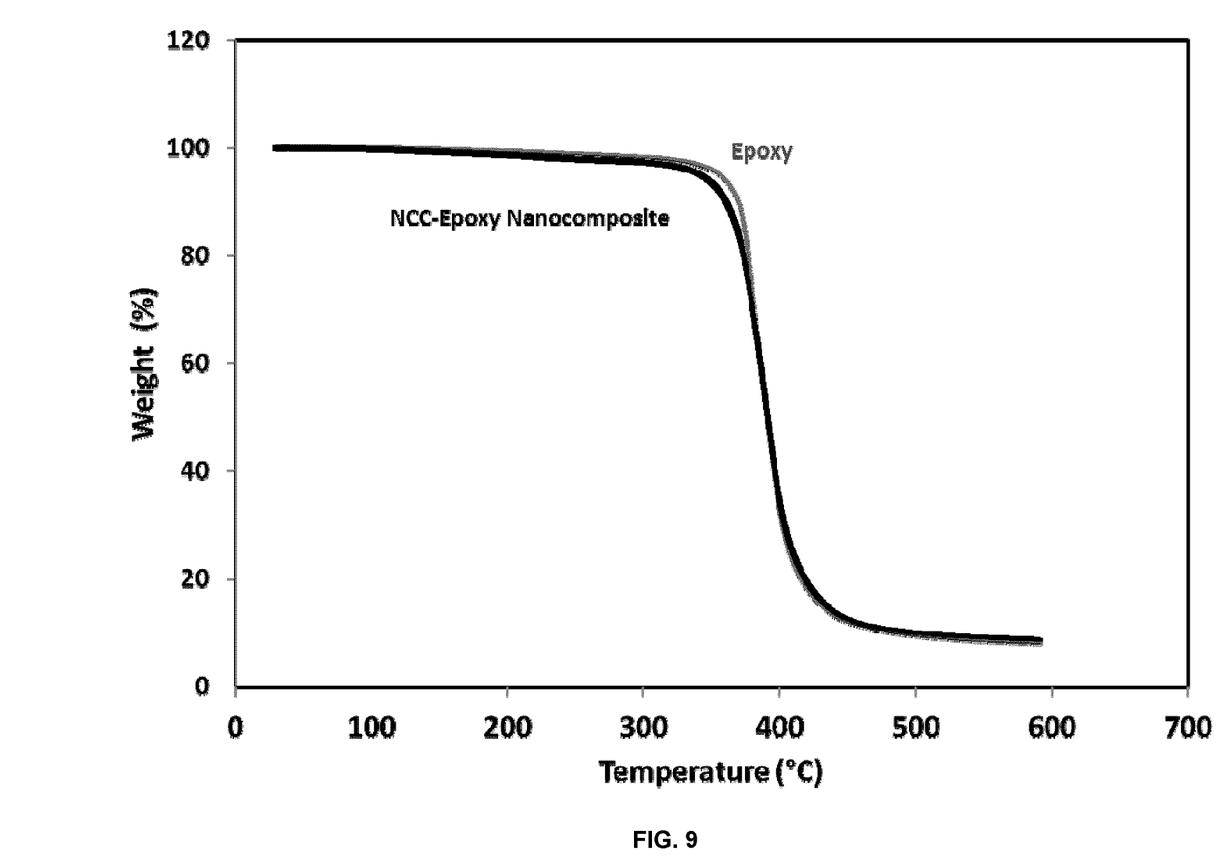
FIG. 9 is thermal gravimetric analysis (TGA) of nanocomposite samples obtained form or poly(DPMA) functionalized NCC amine-cured epoxy (bisphenol A diglycidylether)
Figure 10:
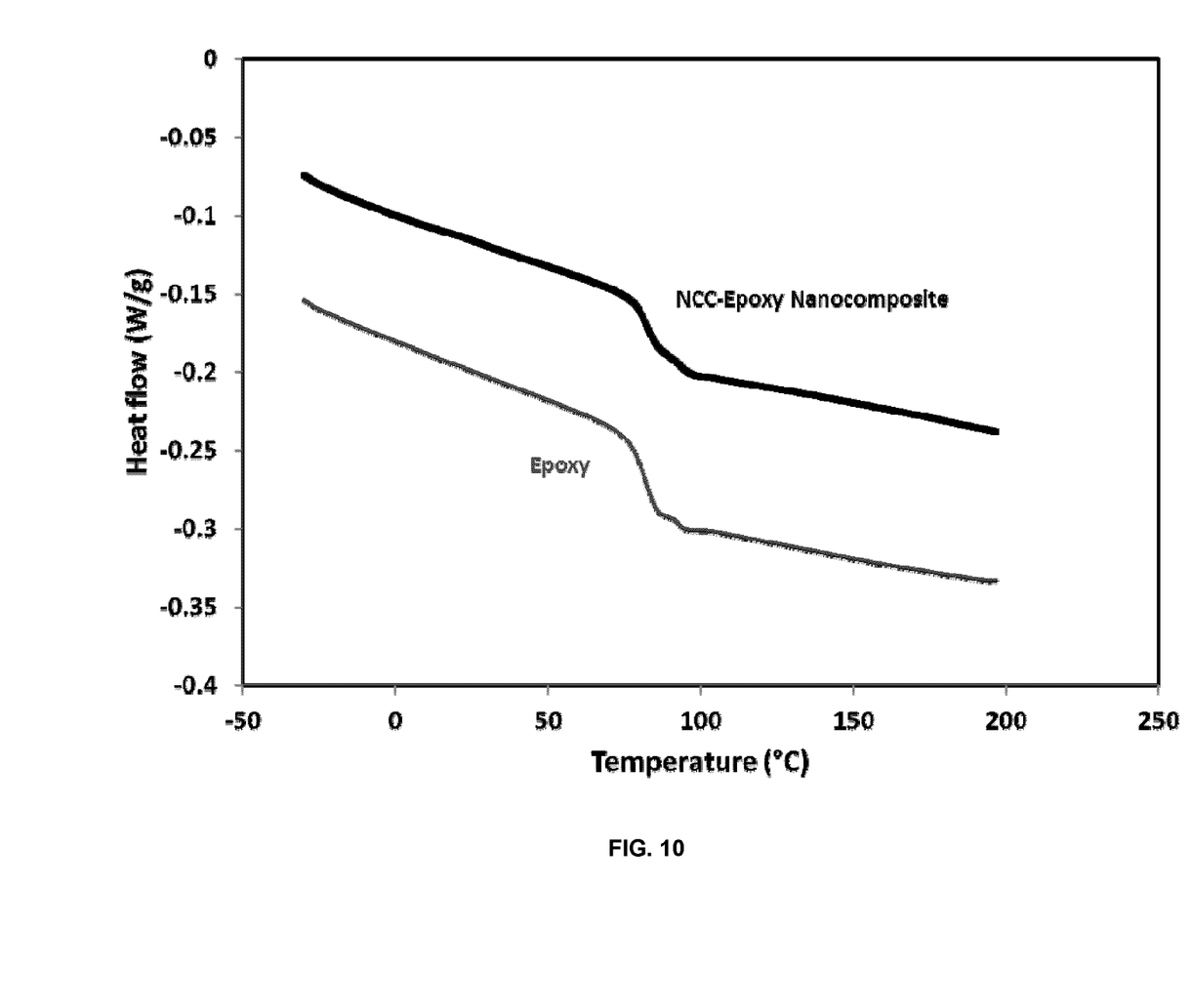
FIG. 10 is differential scanning calorimetric (DSC) analysis of nanocomposite samples obtained form or poly (DPMA) functionalized NCC amine-cured epoxy (bisphenol A diglycidylether).

It is apposite to note that NCC or functionalized NCC clearly does not affect the thermal stability of the resulting NCC-epoxy nancomposite materials as can be seen from the is thermal gravimetric analysis (TGA), performed using TGA Q50 (TA Instruments) under nitrogen atmosphere, of amine-cured epoxy and NCC-reinforced epoxy nanocomposite samples. Tests were carried out from 30° C. to 600° C. at 20° C.min$^{-1}$ (FIG. 9). FIG. 10 is differential scanning calorimetric (DSC) analysis, using DSC Q100 (TA Instruments), of amine-cured epoxy and NCC-reinforced epoxy nanocomposite samples. Samples were tested from −40° C. to 200° C. at 10° C.min$^{-1}$ under nitrogen atmosphere. The second cycles were used for analysis

TABLE 1

Tensile testing results for NCC-epoxy nanocomposite materials using D.E.R. 332.

| | Ultimate Tensile Stress (MPa) | Young's Modulus (MPa) | Strain at Break (%) |
|---|---|---|---|
| Epoxy | 50.7 ± 1.7 | 2084 ± 137 | 8.4 ± 2.6 |
| NCC-Epoxy nanocomposite [NCC] = 4 wt. % | 54.2 ± 3.0 | 2465 ± 248 | 9.7 ± 2.7 |
| NCC-Epoxy nanocomposite [Functionalized NCC] = 4 wt. % | 60.0 ± 1.3 | 2712 ± 38 | 15.2 ± 1.7 |

TABLE 2

Tensile testing results for NCC-epoxy nanocomposite materials using D.E.N. 438.

| Samples | Ultimate Tensile Stres (MPa) | Young's Modulus (MPa) | Strain at Break (%) |
|---|---|---|---|
| Epoxy | 56.2 ± 1.96 | 2255 ± 125 | 6.0 ± 0.83 |
| NCC-epoxy nanocomposite [functionalize NCC] = 4 wt. % | 67.0 ± 1.7 | 2720 ± 56 | 7.8 ± 1.2 |

TABLE 3

Cross-linking density of NCC-epoxy nanocomposite systems.

| | Epoxy | NCC-Epoxy Nanocomposite [NCC] = 4 wt. % | NCC-Epoxy Nanocomposite [Functionalize NCC] = 4 wt. % |
|---|---|---|---|
| Density (g/cm$^3$) | 1.135 | 1.154 | 1.142 |
| $M_c$ | 581 | 174 | 200 |

This novel NCC-epoxy nanocomposite material with tailor-made performance has practically identical thermal stability and processability to the starting epoxy resin. It can have significantly wide applications ranging from adhesives, composite laminates, composite sandwich structures, thin films, fibres, nonwoven networks, and other structures comprising one or more of the above.

While the disclosure has been described in connection with specific embodiments thereof, it is understood that it is capable of further modifications and that this application is intended to cover any variation, use, or adaptation of the disclosure following, in general, the principles of the disclosure and including such departures from the present disclosure that come within known, or customary practice within the art to which the disclosure pertains and as may be applied to the essential features hereinbefore set forth, and as follows in the scope of the appended claims.

The invention claimed is:

1. A nanocomposite comprising one or more amine-cured epoxy resin and a functionalized nanocrystalline cellulose (NCC), wherein said nanocomposite is prepared by a process comprising
    (i) providing a mixture of nanocrystalline cellulose (NCC) and one or more monomers, wherein said mixture is suitable for free radical polymerization and said monomer is cross-linkable with epoxy and is aqueous soluble;
    (ii) providing a free radical initiator or a solution thereof;
    (iii) purging oxygen from the mixture of (i) and the solution of (ii);
    (iv) mixing (i) and (ii) after step (iii) and polymerizing the monomer(s) to provide functionalized NCC;
    (v) isolating said functionalized NCC;
    (vi) mixing said functionalized NCC, an amine-curable epoxy resin and hardener in a suitable solvent; and
    (vii) curing the mixture obtained from (vi) to obtain said nanocomposite.

2. A process for preparing an epoxy-based nanocomposite comprising:
    (i) providing a mixture of nanocrystalline cellulose (NCC) and one or more monomers, wherein said mixture is suitable for free radical polymerization and said monomer is cross-linkable with epoxy and is aqueous soluble;
    (ii) providing a free radical initiator or a solution thereof;
    (iii) purging oxygen from the mixture of (i) and the solution of (ii);
    (iv) mixing (i) and (ii) after step (iii) and polymerizing the monomer(s) to provide functionalized NCC;
    (v) isolating said functionalized NCC;
    (vi) mixing said functionalized NCC, an amine-curable epoxy resin and a hardener in a suitable solvent; and
    (vii) curing the mixture obtained from (vi) to obtain said nanocomposite.

3. The process of claim 2, wherein said purging of oxygen in step iii) is conducted by using an inert gas which is the same or different for i) and ii).

4. The process of claim 2, wherein the free radical initiator is a solution.

5. The process of claim 2, wherein said free radical initiator is comprising persulfates, peroxides, or transition metal ions.

6. The process of claim 2, wherein said monomer is an acrylamide.

7. The process of claim 2, wherein said monomer is Dimethylamino propyl methacrylamide (DPMA), N-(Isobutoxymethyl)acrylamide, Methacrylamide, N-(3-Methoxypropyl)acrylamide, N-Isopropylmethacrylamide, N-Isopropylacrylamide, N-(Hydroxymethyl)acrylamide, N-Hydroxyethyl acrylamide, N,N-Dimethylacrylamide, 3-Acryloylamino-1-propanol, N-Acryloylamido-ethoxyethanol, (3-Acrylamidopropyl)trimethylammonium chloride, or 2-Acrylamidoglycolic acid.

8. The process of claim 2, wherein the mass ratio of NCC to that of the monomer is ranging from about 1:10 to about 10:1.

9. The process of claim 2, further comprising the step of purifying said functionalized NCC isolated in step (v).

10. The nanocomposite of claim 1, wherein said amine-curable epoxy resin is comprising diglycidyl ether of bisphenol A (DGEBA or BADGE), bisphenol F type epoxy, epoxy phenol novolac, epoxy cresol novolac or a combination thereof; said hardener is comprising aliphatic amines, cycloaliphatic amines, aromatic amines, polyetheramines, ethyleneamines or a combination thereof.

11. The nanocomposite of claim 10, wherein said one or more monomer is dimethylamino propyl methacrylamide (DPMA).

12. The process as defined in claim 2, wherein said epoxy is comprising diglycidyl ether of bisphenol A (DGEBA or BADGE), bisphenol F type epoxy, epoxy phenol novolac, epoxy cresol novolac or a combination thereof.

13. The process as defined in claim 2, wherein said functionalized NCC in the composite is present in an amount of up to about 15% w/w.

14. The process as defined in claim 2, wherein said one or more monomers is DPMA.

15. The process as defined in claim 2, comprising:
   (i) providing a mixture of NCC and dimethylamino propyl methacrylamide (DPMA);
   (ii) providing a free radical initiator or a solution thereof;
   (iii) purging oxygen from the mixture of (i) and the solution of (ii);
   (iv) mixing (i) and (ii) after step (iii) and polymerizing DPMA;
   (v) isolating said functionalized NCC;
   (vi) mixing said functionalized NCC, an amine-curable epoxy resin and a hardener in a suitable solvent; and
   (vii) curing the mixture obtained from (vi) to obtain said nanocomposite.

16. The process as defined in claim 15, wherein the hardener is comprising aliphatic amines, cycloaliphatic amines, aromatic amines, polyetheramines, ethyleneamines or a combination thereof.

17. The process as defined in claim 15, wherein said amine-curable epoxy resin is comprising diglycidyl ether of bisphenol A (DGEBA or BADGE), bisphenol F type epoxy, epoxy phenol novolac, epoxy cresol novolac or a combination thereof; and said hardener is comprising aliphatic amines, cycloaliphatic amines, aromatic amines, polyetheramines, ethyleneamines or a combination thereof.

* * * * *